United States Patent [19]

Ogawa

[11] Patent Number: 4,673,474
[45] Date of Patent: Jun. 16, 1987

[54] MOLECULAR CONTROLLED STRUCTURE AND METHOD OF PRODUCING THE SAME

[75] Inventor: Kazufumi Ogawa, Hirakata, Japan

[73] Assignee: Matsushita Electric Industrial Co., Ltd., Osaka, Japan

[21] Appl. No.: 787,368

[22] Filed: Oct. 15, 1985

[30] Foreign Application Priority Data

Oct. 16, 1984 [JP] Japan .................................. 59-216649

[51] Int. Cl.$^4$ .............................................. B01J 19/12
[52] U.S. Cl. .......................... 204/157.64; 204/157.74; 204/157.76; 204/157.81; 428/910; 522/99
[58] Field of Search ........... 204/157.6, 157.63, 157.74, 204/157.76, 157.81; 428/910; 522/99

[56] References Cited

U.S. PATENT DOCUMENTS

| | | | |
|---|---|---|---|
| 2,959,569 | 11/1960 | Warrick | 204/157.64 |
| 3,305,524 | 2/1967 | Brown et al. | 204/157.64 |
| 3,573,334 | 3/1971 | Wheeler | 204/157.64 |
| 4,188,273 | 2/1980 | Sano et al. | 204/157.64 |
| 4,597,999 | 7/1986 | Lingwood | 204/157.81 |

OTHER PUBLICATIONS

Netzer et al, J. Amer. Chem. Soc., (1983), vol. 105, pp. 674–676.
Yoshio Okahata et al., "A Large Nylon Capsule Coated with a Synthetic Bilayer Membrane. Permeability Control of NaCl by Phase Transition of the Dialkylammonium Bilayer Coating", Journal of the Americal Chemical Society, vol. 105, No. 15, Jul. 27, 1983.
Hatsuo Ishida et al., "Molecular Organization of the Coupling Agent Interphase of Fiber–Glass Reinforced Plastics", *Journal of Polymer Science, Polymer Physics Edition,* vol. 17, 1807–1813, (1979), pp. 1806–1813.
Anthony DiBenedetto et al., "Characterization of S–-Glass/Polymer Interfaces Using Ion Scattering Spectroscopy and Scattered Ion Mass Spectroscopy", Journal of Colloid and Interface Science, vol. 64, No. 3, May 1978, pp. 480–500.

*Primary Examiner*—Howard S. Williams

[57] ABSTRACT

Disclosed is a molecular controlled structure which includes a plurality of normal chain hydrocarbon molecules having at one end an energy responsive group such as a double bonding between carbon atoms as C=C and having at the other end a reaction group which reacts the responsive group such as Si. Some of the molecules have functional groups which respond to light, electron beams, X-rays, r-rays, heat, electrons, or ions. The molecules are bonded in a three dimensional configuration.

7 Claims, 9 Drawing Figures

MOLECULAR CONTROLLED STRUCTURE AND METHOD OF PRODUCING THE SAME

BACKGROUND OF THE INVENTION

This invention relates to a molecular controlled structure in which functional molecules are disposed regularly in a three dimensional manner and method of producing the same, and more particularly to a molecular controlled structure which may be used for molecular devices etc.

We can see the result of researches regarding molecular devices which were conducted so far in various publications such as "Proceedings of Molecular Electronic Devices Workshop", Washington, D.C., 23~24 March (1981) and "Proceedings of 2nd International Workshop on Molecular Electronic Devices," Washington D.C., Apr. 13~15, (1983).

However, in the past, as concrete examples of method of producing a molecular controlled structure such as molecular devices etc., merely Langmuir-Blodgett's technique (LB technique) and chemical absorption technique (CA technique) were known to public.

The LB technique is shown and described in detail in G. L. Grains, Jr. "Insoluble Molecular at Liquid-Gas Interface", Interscience, New York, (1966). The CA technique is shown and described in A. T. DiBenedetto, D. A. Scole. J. Colloid Interface Sci., 64, 480 (1978): H. Ishida, S. Naviroj, J. L. Koenig, "Physico Chemical Aspects of Polymer Surface" Vol. 1, p. 91, Ed. K. L. Mittal, Plenum, N.Y. (1983): H. Ishida, J. L. Koenig, J. Polymer Sci., 17, 1807 (1979); L. Netzer, J. Sagiv, J. Am. Chem. Soc., 105, 674 (1983).

The LB and CA techniques are methods for producing monomolecular films or monomolecular built-up films. By use of these techniques, a molecular controlled structure, which has regularity to some degree in a direction perpendicular to the surface of a built-up or stacked film, can be obtained by changing the kinds of molecules, but is almost impossible to have the molecular controlled structure include regularity in a direction of the surface of the film by changing the kinds of molecules on the film surface.

In summary, the conventional LB and CA techniques are methods capable of producing a molcular controlled structure which is controlled only in a two-dimensional direction, but it is impossible to produce a molecular controlled structure which is controlled in a three-dimensional direction.

SUMMARY OF THE INVENTION

Accordingly, a principal object of the invention is to provide a molecular controlled structure which has three-dimensional structure and is used for molecular devices, as a molecular memory device etc in biocomputers and a method of producing the molecular controlled structure.

This and other objects will be accomplished by a molecular controlled structure which comprises a plurality of normal chain hydrocarbon molecules, each having at one end thereof a energy responsive group and having at the other end thereof a reaction group which reacts with the responsive group or an induced group from the responsive group. At least some of the molecules have functional groups which responds to light, electron beams, X-rays, r-rays, heat, electrons, or ions. The molecules are connected in a three dimensional configuration.

In a specific embodiment, the energy responsive group includes double bonding of the C=C or carbon atoms, and the reaction group includes a Si. The functional group includes conjugated double bonding or a group which forms a conjugated double bonding in the course of producing the molecular controlled structure.

This invention also relates to a method of producing a molecular controlled structure which comprises the steps of forming a thin film which includes a responsive group producing a chemical reaction due to irradiation of an energy beam on a substrate, selectively activating the responsive group by irradiating energy beams with a thin film in a pattern in a gaseous atmosphere or in a liquid, and selectively bonding a chemical substance on said activated portion.

In a specific embodiment, as the chemical substance, a molecule having reaction group to be reacted with the responsive group activated at one end and having another responsive group which functions in the same manner as the responsive group at the other end is used. A molecular thin film is formed by a Langmuir Brodgett technique or an absorptiion technique in such a manner that responsive groups are exposed and juxtaposed on the surface of a substrate in the step of forming the thin film. The chemical substance or reagent includes a Si and a vinyl group. The chemical substance or reagent includes an —NH$_2$ group, a —SH group, and a —C≡CH group.

This invention has various advantages, among which are as follows. By use of this invention, it becomes possible to form a functional molecule which is needed at a desired position on a substrate. This is advantageous in the production of molecular devices etc. Further, a molecular wiring technique according to this invention may be utilized in the production of bio-computers etc.

While the novel features of the invention are set forth with particularity in the appended claims, the invention, both as to organization and content, will be better understood and appreciated, along with other objects and features thereof, from the following detailed description in conjunction with the drawings.

DETAILED DESCRIPTION OF THE INVENTION

Figure 2:
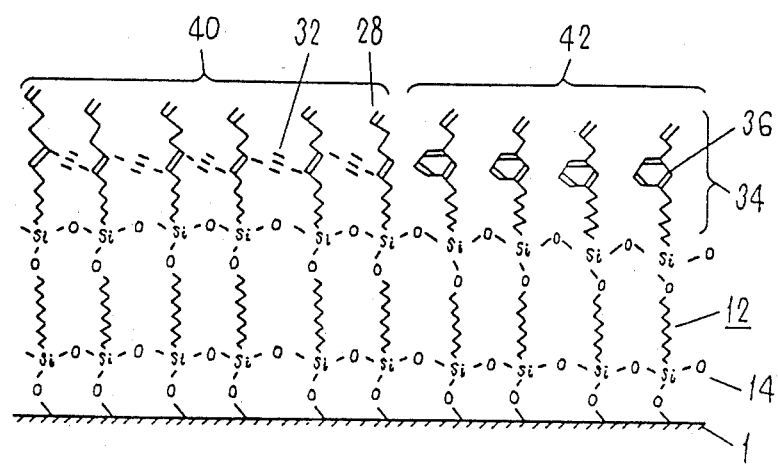
Figure 3:
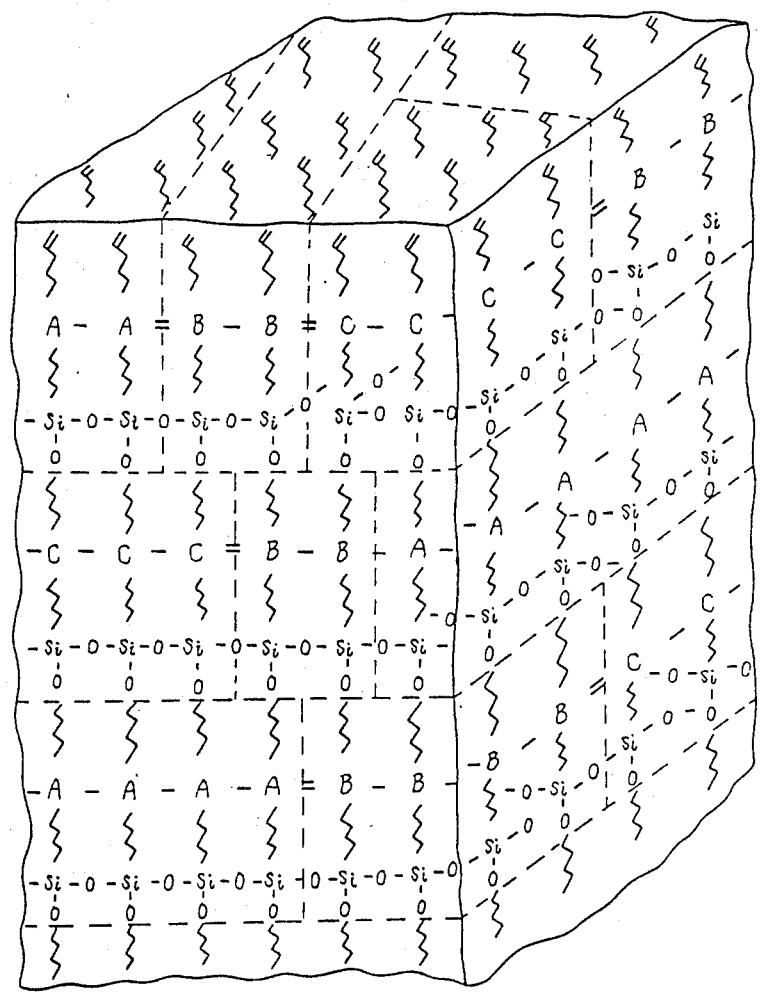
FIG. 3 shows the configuration of a molecular controlled structure according to the invention.

In the following, the embodiments of this invention are described with reference to FIGS. 1~3.

A first embodiment of this invention is described with reference to FIG. 1. On a Si substrate 10 formed with SiO$_2$, there is formed by a chemical adsorption process, a monomolecular film 12 of

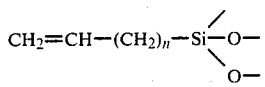

through hydrolysis and dessication, and the reaction with the surface of a silane surface active agent, e.g., $CH_2=CH-(CH_2)_n-SiCl_3$ (n represents an integer, preferably being 10~20). For example, the treated substrate is dipped in a solution of this surfactant at its concentration of $2.0 \times 10^{-3} - 5.0 \times 10^{31\ 2}$ mol/l in 80% n-hexane, 12% tetrachlorocarbon and 8% chloroform, to form a bonding 14 of

Figure 1A:
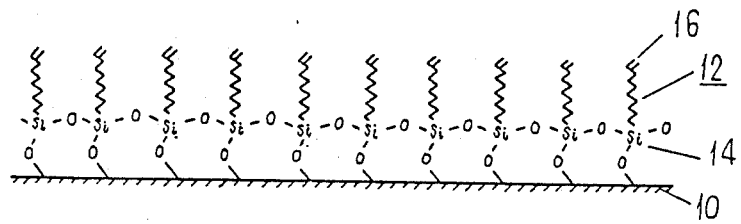
FIGS. 1(a)~(c) are representations explaining a technique for producing a molecular controlled structure according to the invention.

at the $SiO_2$ surface [FIG. 1(a)].

Now, the vinyl groups 16 of the silane surface active agent are juxtaposed on the surface of substrate 10.

Figure 1B:
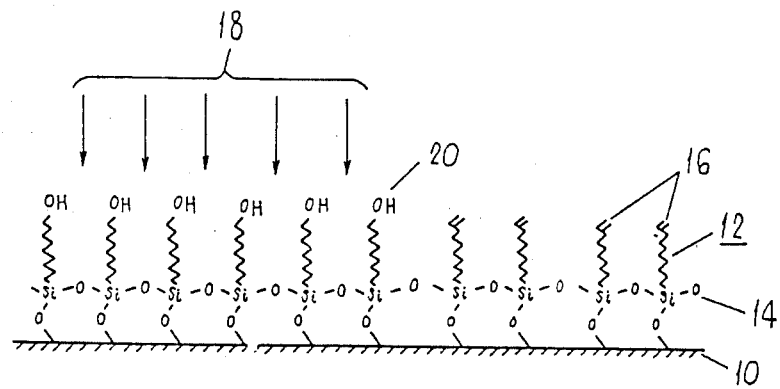

Then, electron beams 18, which are converged to about 50 Å in diameter, are used as energy beams and are irradiated onto the surface in a pattern under an $H_2O$ atmosphere of about $10^{-3} \sim 10^{-4}$ of $H_2O$ so that active groups, i.e., —OH groups 20 are added to a part of the vinyl groups 16 in accordance with the irradiation pattern [FIG. 1(b)].

Thereafter, a silane surface active agent ($CH_2=CH-(CH_2)_n-SiCl_3$) 22 is added to active group portion which has an —OH group 20 by use of the similar technique to that above stated, so that a bonding 24 of

Figure 1C:
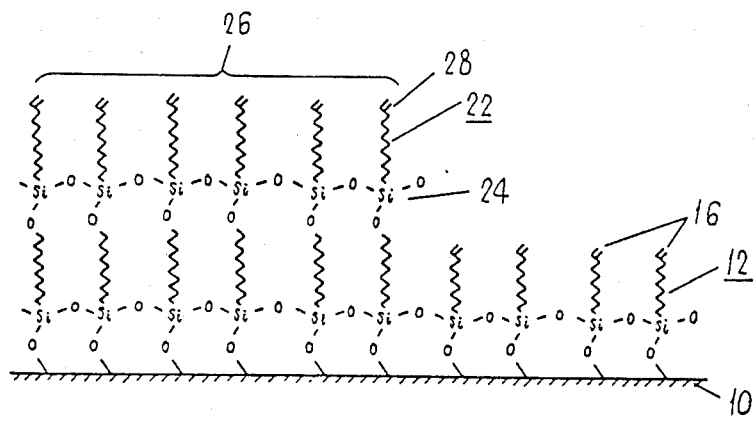

is formed [FIG. 1(c)].

That is, by the above-stated process, a molecular film 26 of

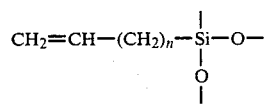

is selectively formed at a desired area. Further, on the surface of the molecules added, vinyl groups 28 are juxtaposed and form a film.

By the repetition of the pattern of irradiation of the energy beams, and the addition of a reactive silane surface active agent, a molecular controlled structure is produced in such a manner that molecules are juxtaposed regularly in a three dimensional direction.

In the above-stated embodiment, normal chain type hydrocarbons which have $CH_2=CH-$ groups at one end of the molecules and have $-SiCl_3$ groups at the other end of molecules (silane surface active agent) are used. If functional groups, for example, diacetylene, pyrrole, chenylene, phenylene etc. are inserted between the $-CH_2-CH_2-$ bondings of normal chain type hydrocarbons or added instead of H, conjugated double bondings which show electric conductivity at the molecular level can be formed and it is possible to control the forming of wiring of organic molecules which are necessary for the production of molecular devices at the molecular level.

Figure 2A:
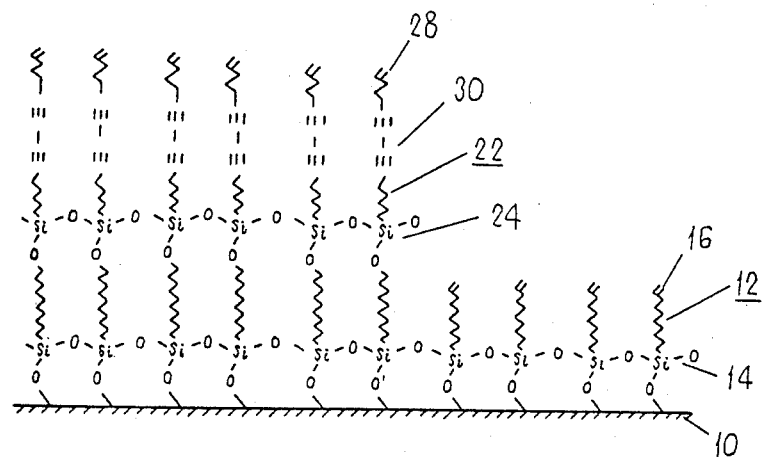
FIGS. 2(a)~(e) are representations explaining a technique for forming molecular wirings by use of the FIG. 1 technique.
Figure 2B:
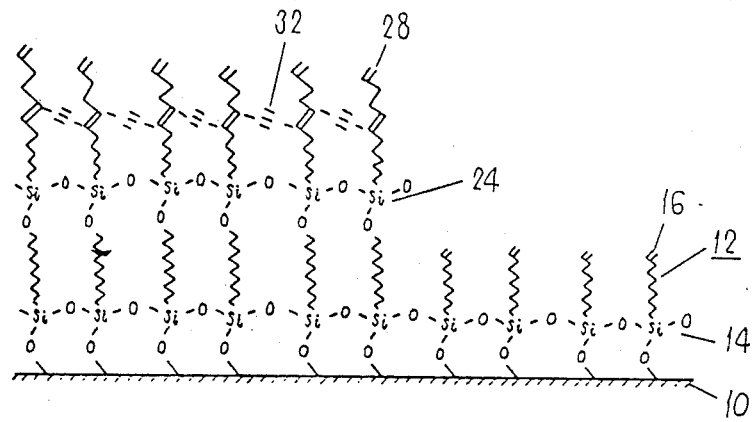

For example, as shown in FIG. 2(a), diacetylene group 30 is inserted between $-CH_2-CH_2-$ groups. After a molecular controlled structure is formed, a deep UV irradiation is effected so that molecular wiring of the poly-diacetylene 32 [FIG. 2(b)] can be formed in a direction which is desired in the same plane.

In case that electric conductivity is needed in a vertical direction, molecules, in each of which insertion position of the poly-diacetylene into a normal chain hydrocarbon portion is shifted every 3 carbon atoms.

Figure 2C:
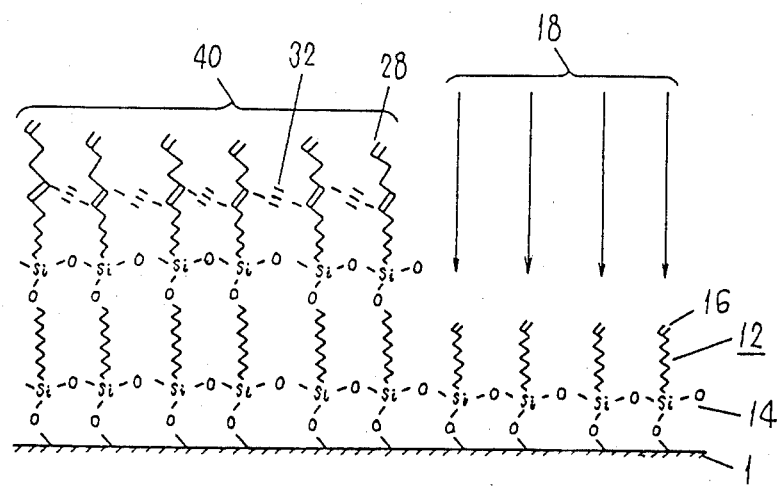
Figure 2D:
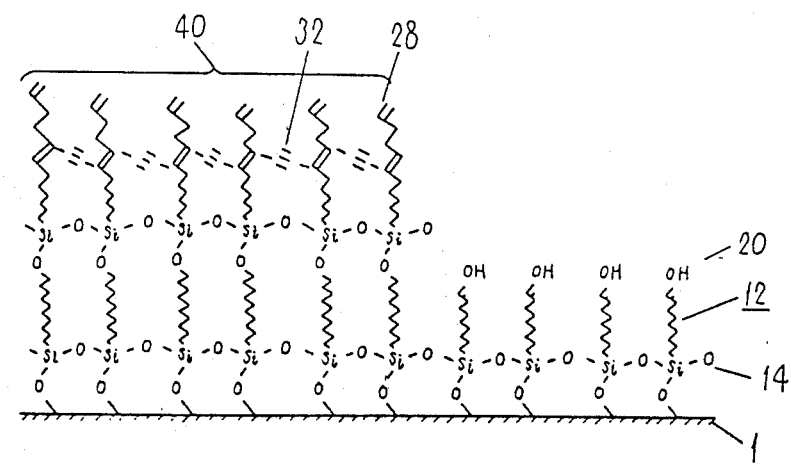

Further, as shown in FIGS. 2(c)~(e), molecules 34 including a phenyl group 36 instead of the abovestated diacetylene group can be added by the irradiation of electron beams 18 at the side position of the poly-diacetylene forming layer 40, whereby molecules having a phenyl group are regularly formed as a layer 42, in adjacent to the layer 40 of molecules having diacetylene group.

When a $CH\equiv CH-$ group is used instead of a $CH_2=CH-$ group and an $-NH_2$ group is used instead of a $-SiCl_3$ group, the same advantages as stated above may be obtained.

In another method, cyanobromide (CNBr) is added to the —OH group 6 as shown in the following formula (3) to be thereby cyanized.

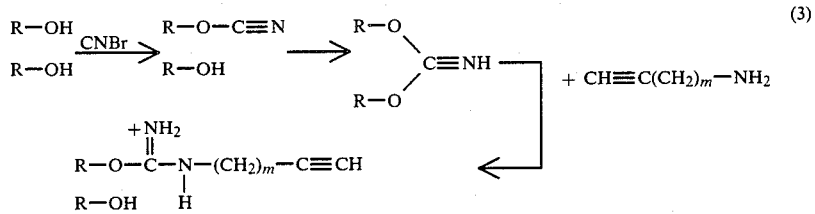

(3)

Thereafter, an amino group is reacted therewith so that a monomolecule can be selectively added. [cyanobromide technique].

As still another method, there is a method in which an amino group is added by use of an end epoxy group as shown in the following formula (4) [epoxy technique].

As one example, there is a case in which $CH\equiv CH-(CH_2)_n-NH_2$ is selectively added. In this case, the —OH group 6 of $-(CH_2)_n-OH$, formed in the same manner as shown in FIG. 1(b), is oxidized by the periodic acid ($HIO_4$) to thereby be aldehyded as shown in the following formula (1).

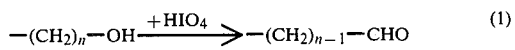

(1)

Thereafter, it is selectively reacted with an —NH₂ group which is then added thereto as shown in the following formula (2). [aldehyde technique]

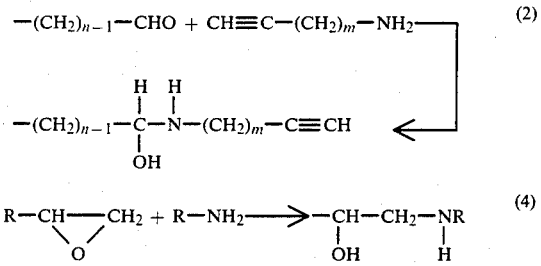

Further, an addition reaction by use of a reaction between an end thiol group (R—SH) and

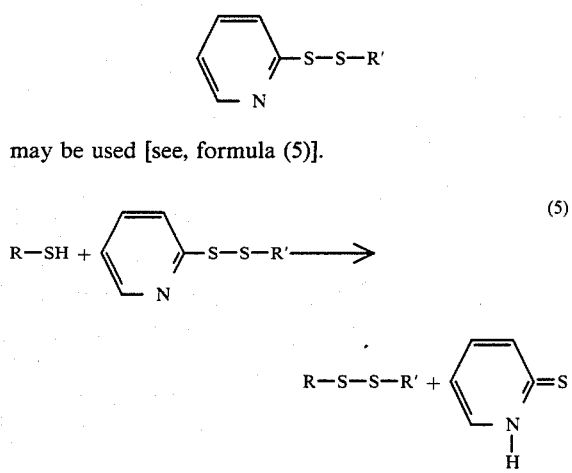

may be used [see, formula (5)].

In the forgoing embodiments, if the diameter of the electron beam is made smaller (e.g., about 5 Å), it becomes possible to produce a molecular controlled structure by controlling each molecule one by one.

It is also possible to form molecules with regularity at a desired portion by controlling a pluarality of different molecules. For example, it is possible to produce a molecular controlled structure shown in FIG. 3. In FIG. 3, A, B, C represent different functional groups, respectively. The molecules having 3 kinds of functional groups are formed regularly in 3 (i.e., vertical, horizontal, hight) directions.

While specific embodiments of the invention have been illustrated and described herein, it is realized that modifications and changes will occur to those skilled in the art. It is therefore to be understood that the appended claims are intended to cover all modifications and changes which fall within the true spirit and scope of the invention.

What is claimed is:

1. A molecular controlled structure comprising:
   a first layer including a plurality of normal chain hydrocarbon molecules, each molecule having at one end thereof an energy responsive group and having at the other end thereof a reaction group;
   a second layer formed on a first portion of said first layer at which first portion, said energy responsive group of said first layer is activated by irradiation of energy beams applied thereto, each molecule of said second layer having at one end thereof an energy responsive group and having at the other end thereof a reaction group which reacts with said responsive group of said first layer or an induced responsive group from said first layer; and
   a third layer formed on a second portion of said first layer at which second portion, said energy responsive group of said first layer is activated by irradiation of energy beams applied thereto, said second portion being different from said first portion, and each molecule of said third layer having at one end thereof an energy responsive group and having at the other end thereof a reaction group which reacts with said responsive group of said first layer or an induced group from said responsive group of said first layer,
   whereby said molecules are bonded with regularity in a three-dimensional configuration.

2. The molecular controlled structure of claim 1, wherein said energy responsive group includes double bonded carbon groups as in C═C, and said reaction group includes Si.

3. The molecular controlled structure of claim 1, wherein said functional group includes a conjugated double bonding or a group which forms a conjugated double bonding in the course of production of said molecular controlled structure.

4. A method of producing a molecular controlled three-dimensional structure comprising:
   forming a first layer on a substrate, said first layer including a plurality of normal chain hydrocarbon molecules, each molecule having at one end thereof, an energy responsive group and having at the other end thereof a reaction group,
   forming a second layer made up of molecules having at one end an energy responsive group and at the other end a reaction group on a first portion of said first layer by irradiating said first layer with energy beams to activate the energy responsive group of said first layer whereby the reaction groups of the second layer react with the responsive groups of said first layer or induced groups from said responsive groups of the first layer to form said second layer on the first layer; and,
   forming a third layer made up of molecules having at one end an energy responsive group and at the other end a reaction group on a second portion of said first layer by irradiating the second portion of the first layer with energy beams so that the reaction groups of the third layer react with the responsive groups of the first layer or induced groups from said responsive groups to form the third layer on the second portion of the first layer, said second portion of the first layer being different than the first portion of the first layer.

5. The method of claim 4 wherein a monomolecular film is formed on a surface of the substrate by a Langmuir Brodgett or absorption technique in such a manner that the responsive groups of the first layer are exposed and juxtaposed on the surface of the substrate so that said film is formed by irradiation.

6. The method of claim 5, wherein said chemical substance includes an —NH₂ group, an —SH group, and a —C≡CH group.

7. The method of claim 5 wherein said chemical substance includes a —C≡C—C≡C—, a

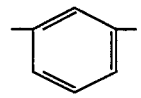

group, and a —C═C— group.

* * * * *